(12) United States Patent
Ekladyous

(10) Patent No.: US 7,377,580 B1
(45) Date of Patent: May 27, 2008

(54) MULTI-TIER STRUCTURE FOR CAR BODY HOOD

(76) Inventor: Nicholas Samir Ekladyous, 6417 Webster Rd., Imlay City, MI (US) 48444

( * ) Notice: Subject to any disclaimer, the term of this patent is extended or adjusted under 35 U.S.C. 154(b) by 0 days.

(21) Appl. No.: 11/716,231

(22) Filed: Mar. 10, 2007

(51) Int. Cl.
*B62D 25/10* (2006.01)

(52) U.S. Cl. ............... 296/193.11; 296/187.09; 296/191; 180/69.21

(58) Field of Classification Search .......... 296/187.03, 296/187.09, 187.11, 193.11, 191; 293/133; 188/371; 180/274, 69.2, 69.21
See application file for complete search history.

(56) References Cited

U.S. PATENT DOCUMENTS

| | | | |
|---|---|---|---|
| 4,359,120 A | 11/1982 | Schmidt | |
| 5,549,327 A * | 8/1996 | Rusche et al. | 280/751 |
| 5,934,743 A | 8/1999 | Nohr | |
| 6,186,582 B1 * | 2/2001 | Beckmann | 296/187.05 |
| 6,447,049 B1 | 9/2002 | Tohda | |
| 6,554,341 B2 | 4/2003 | Lee | |
| 6,681,907 B2 * | 1/2004 | Le | 188/371 |
| 6,746,074 B1 | 6/2004 | Kempf | |
| 6,848,738 B2 | 2/2005 | Kempf | |
| 6,905,136 B2 * | 6/2005 | Vidal et al. | 280/752 |
| 7,090,289 B2 | 8/2006 | Koura | |
| 7,114,765 B2 | 10/2006 | Ishikawa | |
| 7,150,496 B2 | 12/2006 | Fujimoto | |
| 7,182,191 B2 * | 2/2007 | Scott et al. | 188/372 |
| 2002/0167183 A1 * | 11/2002 | Shimotsu et al. | 293/132 |

OTHER PUBLICATIONS

EEVC Working Group 17 Report, Improved Test Methods to Evaluate Pedestrian Protection Afforded by Passenger Cars, Dec. 1998 with Sep. 2002 Updates; pp. 1-13 & 19-27 & 37-41; Europe.

* cited by examiner

*Primary Examiner*—Joseph D Pape

(57) ABSTRACT

A hood structure comprises an outer and an inner which form a closed cross section through spaces. The inner's cross-sectional shape is an interconnected stair step curve based on a series of concentric geometric shapes. This multi-tiered hood structure can provide a uniform, excellent head impact resistance independent of material selection for the outer and inner panels. The multi-tiered hood structure also excels in rigidity, strength, weight, cost and manufacturability. Accordingly, the car body hood panel structure efficiently satisfies requirements of head impact resistance for pedestrian protection.

12 Claims, 7 Drawing Sheets

Prior Art

Prior Art

MULTI-TIER STRUCTURE FOR CAR BODY HOOD

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND FIELD OF THE INVENTION

The present invention relates to a car body hood panel structure that excels in the head impact resistance for protecting a pedestrian and is made of a metal material such as stainless steel, excellent in rigidity, strength, manufacturability, weight reduction, cost reduction, corrosion resistance and the like.

BACKGROUND PRIOR ART

Conventionally, the panel structure of car body members such as for automobiles uses a closed sectional structure through spaces in combination with an outer panel (hereafter simply referred to as an outer) and an inner panel (hereafter simply referred to as an inner).

The panel structures for a car hood, a roof, doors, and the like especially use mechanical, soldering, and adhesive means such as resins to combine the outer and the inner that is provided at one side of the outer toward the bottom of the car body to reinforce the outer. The inner or both the inner and the outer for these car body panel structures are manufactured from highly rigid and moldable aluminum alloy plates for weight saving in addition to or instead of the conventionally used steel. Hereafter, aluminum is simply represented as AL.

Recently, car panel structures including the AL alloy plates need to be highly rigid as well as thin and lightweight. The member characteristics need to excel in the bending rigidity, the torsional rigidity, and tension rigidity (dent resistance) and strength.

Conventionally, car body hood inners are available in the beam type and the cone type. The beam-type inner provides each panel with a trim section (cut outs) for weight saving. The cone-type inner has no trim section on the basis of the closed sectional structure. Relatively large convex sections (protrusions) called cones are arranged on the cone-type inner at a regular interval. Each cone has a trapezoidal sectional view. With respect to the tension rigidity and the bending rigidity, a hood structure using this inner (cone-type hood structure) is equivalent to a structure using the beam-type inner (beam-type hood structure) in accordance with the rigidity design of the hood. On the other hand, with respect to the torsional rigidity, the cone-type hood structure is approximately twice as rigid as the beam-type hood structure. Recently, special attention is paid to the cone-type hood structure.

Recently, from the viewpoint of protecting pedestrians, hood design requirements tend to consider the safety against impact to a pedestrian's head. Concerning the beam-type hood structure, there are several design configurations. In addition, the EEVC (European Enhanced Vehicle-Safety Committee) specifies a Head Injury Criteria value of 1000 or less as a hood condition with respect to the impact resistance to adult and child heads (described in EEVC Working Group 17 Report, Improved Test Methods to Evaluate Pedestrian Protection Afforded by Passenger Cars, December 1998 with September 2002 Updates). Hereafter, Head Injury Criteria is simply represented as HIC.

However, the prior art is accompanied by the following problems.

(1) [Problem 1] Increasing the Rigidity

There may occur cases where the conventional cone-type and beam-type inners cannot satisfy the demand for increased rigidity when they are thinned and made to be lightweight. FIG. 6 is a perspective view of a cone-type inner. As shown in these figures, there are arranged many conic convex sections (protrusions) 10 at a regular interval on the surface of a cone-type inner 20. There is formed a flat section or a concave section 30 between the convex sections 10. The adhesive bead 50 is universally used for reinforcing the rigidity of the inner as shown in FIG. 6. The cone-type inner 20 is joined to an AL alloy outer 40 having a specified geometry to constitute the closed sectional structure through spaces and is integrated into a panel structure FIG. 6 In the example of FIG. 6, there is provided a resin layer 50 on each of the flat tops 10 of the convex inner 20. The resin layer 50 is used to join the convex 10 of the inner 20 to the underside surface of the outer 40. The panel periphery of the outer and inner is hemmed (bent) together and is integrated into the panel structure. The hemmed periphery is not shown.

FIG. 7 is a perspective view showing an example of applying the beam-type inner to a car body hood. As shown in FIG. 7, the beam-type inner 60 comprises beams 70 appropriately crossing longitudinally, transversely, and slantwise with reference to a plane direction of the panel. The beam-type inner has a trim structure having a trimmed space section 80 forming voids between beam sections. The beam-type inner 60 is also joined to the underside surface of an outer 90 to constitute the closed sectional structure through spaces and to be integrated into a panel structure. The hemmed periphery is not shown.

The panel structure is locally reinforced by reinforcing members such as a hinge reinforcement and a latch reinforcement like the cone-type inner. The reinforcing members are not shown. These cone type hood structures are approximately twice as rigid as conventionally used general purpose beam-type hood structures and can be assumed to be excellent in the rigid design. This is because the closed sectional structure of the cone type hood structure excels in the rigidity against a torsional load. In addition, the cone type hood structure has the bending rigidity equivalent to that of the beam-type hood structure. The cone-type hood structure does not necessarily provide the sufficient tension rigidity. The cone-type hood structure is requested to increase the tension rigidity.

As a result, a relatively large, thick plate must be used for the panel at the sacrifice of weight saving in order to increase the tension rigidity for the conventional cone-type inner. Therefore, it is an object of the present invention is to provide a car body hood panel structure capable of satisfying a demand for increased rigidities such as the tension rigidity in order to take advantage of weight saving by thinning the panel on the assumption of high torsional rigidity characteristic of the conventional closed sectional structure.

(2) [Problem 2] Improving the Head Impact Resistance for Protecting Pedestrians

Generally, the head impact resistance is evaluated in accordance with the HIC (Head Injury Criteria) value. HIC is a function of 3-axis resultant acceleration (in units of G) at the head centroid, and t1 and t2 are times having the relationship of 0<t1<t2 to cause a maximum HIC value. An operation time (t2−t1) is specified to be 15 milliseconds or less.

EEVC Working Group 17 Report specifies an HIC value of 1000 or smaller for each of impact resistances to adult and child heads as a condition attributed to the hood. In this report, the adult head impact test uses a head impact speed of 40 km/hr. The test specifies a weight of 4.8 kg, an external diameter of 165 mm, and an impact angle of 65 degrees for the adult head. During the head impact test, the pedestrian's head first impacts on the outer. Then, the deformation progresses to transmit a reactive force to rigid parts such as an engine in the engine room via the inner, causing an excess impact on the head. The head is subject to a first acceleration wave and a second acceleration wave. The first acceleration wave is mainly generated by impact against the outer approximately within 5 milliseconds from the beginning of the impact. When the inner impacts on a rigid object, the second acceleration wave is generated approximately 5 milliseconds or later from the beginning of the impact. The elastic rigidity of the outer mainly determines the magnitude of the first acceleration wave. The elasto-plastic rigidity of the inner mainly determines the magnitude of the second acceleration wave. Deformation energies for the outer and the inner absorb the kinetic energy at the head. If the head's movement distance exceeds a clearance between the outer and a rigid object such as the engine, the head is directly subject to a reactive force from the rigid object like the engine. Consequently, the head is subject to a fatal damage equivalent to an excess impact greatly exceeding the maximum HIC value of 1000.

(3) [Problem 2-1] Capable of Decreasing the HIC Value Despite a Small Head Movement Distance Accordingly as a clearance is increased between the outer and a rigid object such as the engine, the head's movement distance can be increased. This is advantageous to reducing the HIC value because deceleration is slowed. However, the large clearance hood design inevitably is accompanied by limitations from aesthetics and other vehicle constraints. There is a need for a hood structure capable of reducing the HIC value despite a small clearance and a short head movement distance. More severe impact conditions are required especially for the adult's head impact than for the child's head impact. An excess clearance needs to be provided between the outer and the rigid object surface beyond the design allowance (described in EEVC Working Group 17 Report).

(4) [Problem 2-2] Capable of Low HIC Value Independent of Material Selection

There is significant debate & discussion in the prior art of aluminum versus steel for pedestrian protection. The advantages and disadvantages of each material in the application of a hood structure for pedestrian protection are well studied. Some references have recommended dissimilar materials for the outer panel and inner panel (U.S. Pat. No. 7,150,496). However this is not advantageous due to the potential of galvanic corrosion and costs associated with insulating dissimilar materials to prevent corrosion failures. In addition materials like aluminum are difficult to manufacture. Low elongation & low yield strength of aluminum makes it easily susceptible to splitting. There is a need to have a structure that provides good head impact performance for a wide range of materials to provide maximum flexibility. This allows optimization for any performance parameter such as HIC, weight, cost and the like.

(5) [Problem 2-3] Capable of Low HIC Value and Capable of High Strength, High Rigidity, Low Weight, Low Cost and Easy Manufacturability Another problem to be solved is to provide an excellent head impact resistance with aluminum. Aluminum is often used for hoods with pedestrian protection. The aluminum material is also used for light-weighting the hood. Compared to the use of the steel material, however, the use of the aluminum material is generally considered to be disadvantageous from the viewpoint of protecting pedestrians. This is mainly because the elastic modulus and the density of the aluminum material are approximately one third of those of the steel material. If the hood is used to absorb the kinetic energy of the head, the membrane rigidity and the weight of the aluminum hood as the panel structure are insufficient compared to those of the steel hood. The bending rigidity of a plate material is proportional to E times T cubed, where E is a Young's modulus and T is a plate thickness. Young's modulus is a measure of rigidity of a given material. The membrane rigidity thereof is proportional to E times T. When the steel material (Young's modulus Es, plate thickness Ts, and density Ds) is replaced by the aluminum material (Young's modulus Ea, plate thickness Ta, and gravity Da), the plate thickness is determined as follows so that the same bending rigidity results. In the equations shown ".sup." denotes superscript.

$$EaTa^3 = EsTs^3 \ (Ea/Es = 1/3 \ \& \ Da/Ds = 1/3)$$

$$\text{Hence, } Ta/Ts = 3^{1/3} = 1.44$$

A membrane rigidity ratio of the aluminum hood to the steel hood becomes:

$(EaTa)/(EsTs) = 1.44/3 = 0.48$

A weight ratio thereof becomes: $(TaDa)/(TsDs) = 1.44/3 = 0.48$

The membrane rigidity and the weight of the aluminum hood are just 0.48 times as large as those of the steel hood. As a result, when the head impacts on the hood, the head movement distance increases and the head easily impacts on a rigid object. The outer absorbs a small energy at the first acceleration wave, increasing the second acceleration wave. Accordingly, the conventional hood structure increases the HIC value, making it very difficult to satisfy limits of the HIC value. Of course, making Ta equal to a triple of Ts provides the same membrane rigidity ratio and weight ratio as those for the steel hood. However, this causes excess costs & excess weight, unpractical for the design. In this manner, it is very difficult to use the aluminum material for the hood and limiting conditions for the head impact under this condition.

As mentioned above, the following summarizes problems to be solved for the hood structure from the viewpoint of pedestrian protection as another object of the present invention.

(a) Capable of Decreasing the HIC Value Despite a Small Head Movement Distance;

(b) Capable of Low HIC Value Independent of Material Selection; and (c) Capable of Low HIC Value and Capable of High Strength, High Rigidity, Low weight, Low Cost and Easy Manufacturability

SUMMARY

In order to achieve these objects, the car body hood panel structure according to the present invention is expressed as a closed sectional structure comprising a combination of an outer panel and an inner panel through spaces, wherein a plurality of multi-tiered structures is provided parallel to each other on an entire surface of the inner panel and a cross-sectional shape of the inner panel is multi-tiered.

There is provided the inner having a multi-tiered cross section (hereafter referred to as the multi-tiered inner) as mentioned above. The terms multi & multiple are used interchangeably hereafter. If the car body hood panel structure using the multi-tiered inner (hereafter referred to as the multi-tiered hood structure) comprises the outer and the inner which are thinned, it is possible to drastically improve the rigidity of the hood structure. In addition, the bending rigidity and the torsional rigidity can be also ensured sufficiently. As a result, the hood can be suppressed from being deformed against external loads for normal operation such as opening, closing and cleaning.

Further, with respect to pedestrian protection, it is possible to improve the resistance to impact between the head and the hood for higher safety. Consequently, the following features can be provided.

(a) Capable of Decreasing the HIC Value Despite a Small Head Movement Distance;

(b) Capable of Low HIC Value Independent of Material Selection; and (c) Capable of Low HIC Value and Capable of High Strength, High Rigidity, Low weight, Low Cost and Easy Manufacturability In addition, the panel structure according to the present embodiment features a simple configuration using the above-mentioned multi-tiered structure. It is possible to increase the tension rigidity and the bending rigidity, and enable weight saving without increasing the inner plate thickness as conventionally practiced. Contrary to conventional practices there is opportunity to reduce the material thickness with an optimized multi-tier structure. A flat panel can be easily press-molded into the above-mentioned multi-tiered structure, making manufacture of the inner itself easy.

Moreover, as mentioned above, the panel structure according to the present embodiment is capable of improving the rigidity as the panel structure itself. It is possible to use any light weight and low cost material for the outer and the inner panel.

From the viewpoint of hood weight saving, the hood tension rigidity can be improved drastically by means of the multi-tiered inner and the multi-tiered hood structure using the same according to the present embodiment. It is possible to provide the hood structure fully featuring the torsional rigidity and the bending rigidity. From the viewpoint of pedestrian protection, it is possible to provide the hood structure excellent in the head impact resistance. In this case, the hood structure, if made of any material, can sufficiently decrease HIC values even through a small clearance between the outer and a rigid object.

In order to achieve these effects, the above-mentioned multi-tiered shape preferably traces a stair step curve. The stair step refers to the cross section of a group of interconnected concentric shapes. The static rigidity of the hood can be improved through the use of the multi-tiered inner whose multi-tiered shape follows the stair step of concentric shapes forming a closed section. Furthermore, it is possible to decrease the head acceleration for a head impact from the viewpoint of pedestrian protection.

In addition, it is preferable that the plurality of multi-tiered structures is provided in any arrangement selected from those which are parallel or slantwise against a longer direction of the panel structure, and concentric approximately around the center of the panel structure. The multi-tiered inner uses the plurality of multi-tiered structures. Multi-tiered structures are provided in any arrangement selected from those which are parallel or slantwise against a longer direction of the panel structure, and concentric approximately around the center of the panel structure. The static rigidity of the hood can be improved by the plurality of multi-tiered structures comprising a closed section. Furthermore, it is possible to decrease the head acceleration for a head impact from the viewpoint of pedestrian protection.

When the inner panel is locally provided with a reinforced plate, the head impact resistance can be increased at the reinforced position. It is possible to provide the hood structure capable of locally improving the head impact resistance at a position where there is a small clearance between the outer and the rigid object surface.

When there is provided the method of softly joining the outer and the inner, tops of the multi-tiered inner is provided with local bonding sections in a parallel or distributed manner. Since very soft joining sections are provided, there is no sacrifice of a backlash vibration between the outer and the inner during a head impact from the viewpoint of the pedestrian protection. As a result, the head acceleration waveform is disturbed to enable the HIC value to be decreased.

The invention uses the inner (hereafter referred to as the stair step-type inner) whose multi-tiered shape is defined by a stair step function. Consequently, the multi-tiered inner can be designed in consideration for arrangement of complicated rigid parts in an engine room. It is possible to decrease HIC values and improve the head impact resistance.

The invention can efficiently absorb a head impact energy by means of any material for the outer having large membrane rigidity and weight, control the head's first acceleration wave to an appropriate size, and efficiently absorb the remaining impact energy by means of any material multi-tiered inner or the like excellent in the bending rigidity. As a result, it is possible to provide the light-weight and economical hood structure excellent in the head impact resistance.

The invention can provide economical hood structure excellent in the head impact resistance, rigidity, strength, weight, cost and manufacturability compared to prior art.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms.

Therefore, specific details disclosed herein are not to be interpreted as limiting, but rather as a basis for the claims and as a representative basis for teaching one skilled in the art to employ the present invention in virtually any appropriately detailed system, structure or manner.

An embodiment of the multi-tiered hood structure according to the present invention will be described below with reference to the accompanying drawings. The terms multi & multiple are used interchangeably.

Figure 1:
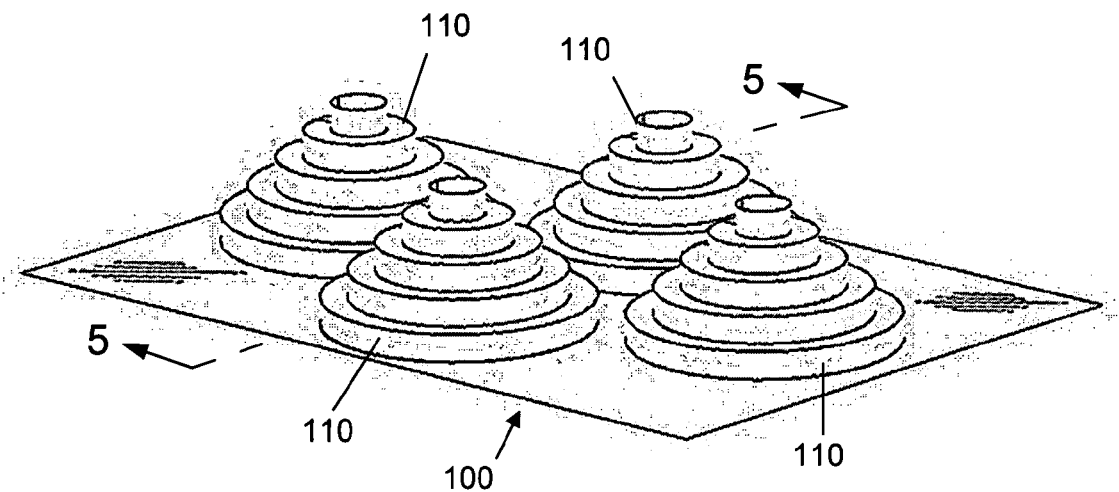
FIG. 1 is a perspective view showing an example of an inner according to the present invention.
Figure 2:
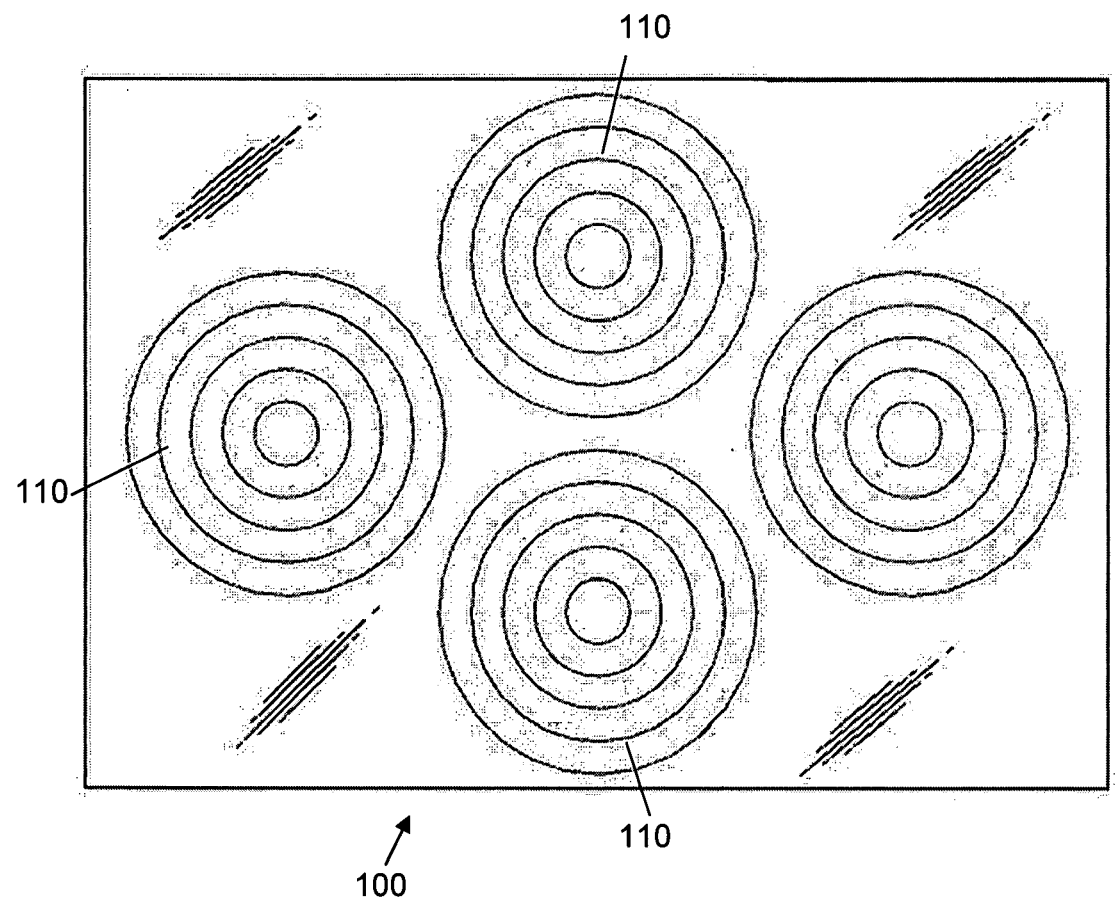
FIG. 2 is a plan view showing an example of an inner according to the present invention.
Figure 5:
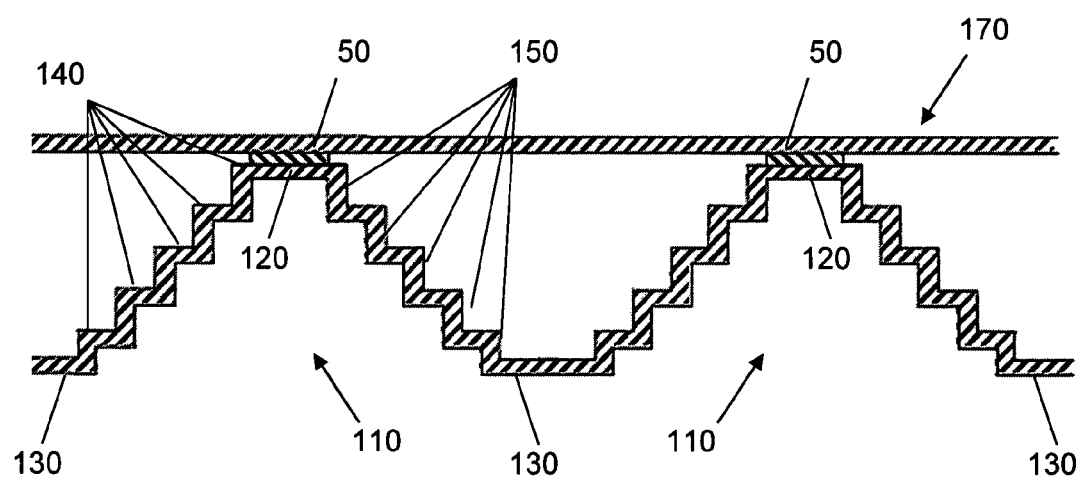
FIG. 5 is a sectional view taken along lines 5—5 of a multi-tiered hood structure using the inner in FIG. 1.
Figure 6:
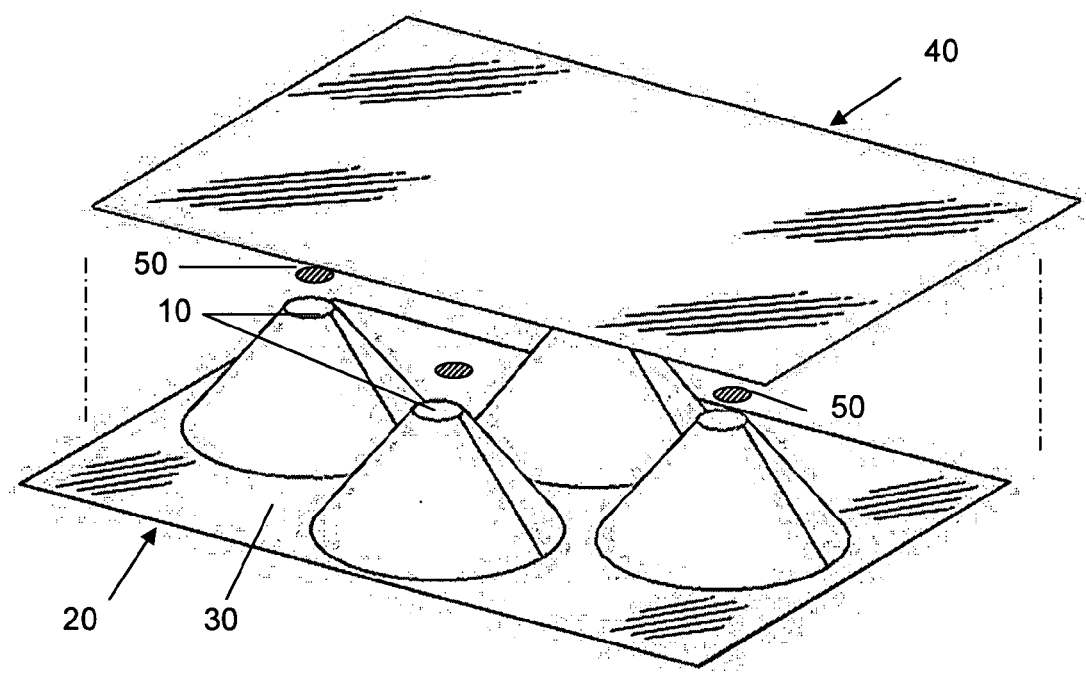
FIG. 6 is a perspective view showing a conventional cone-type hood structure.
Figure 7:
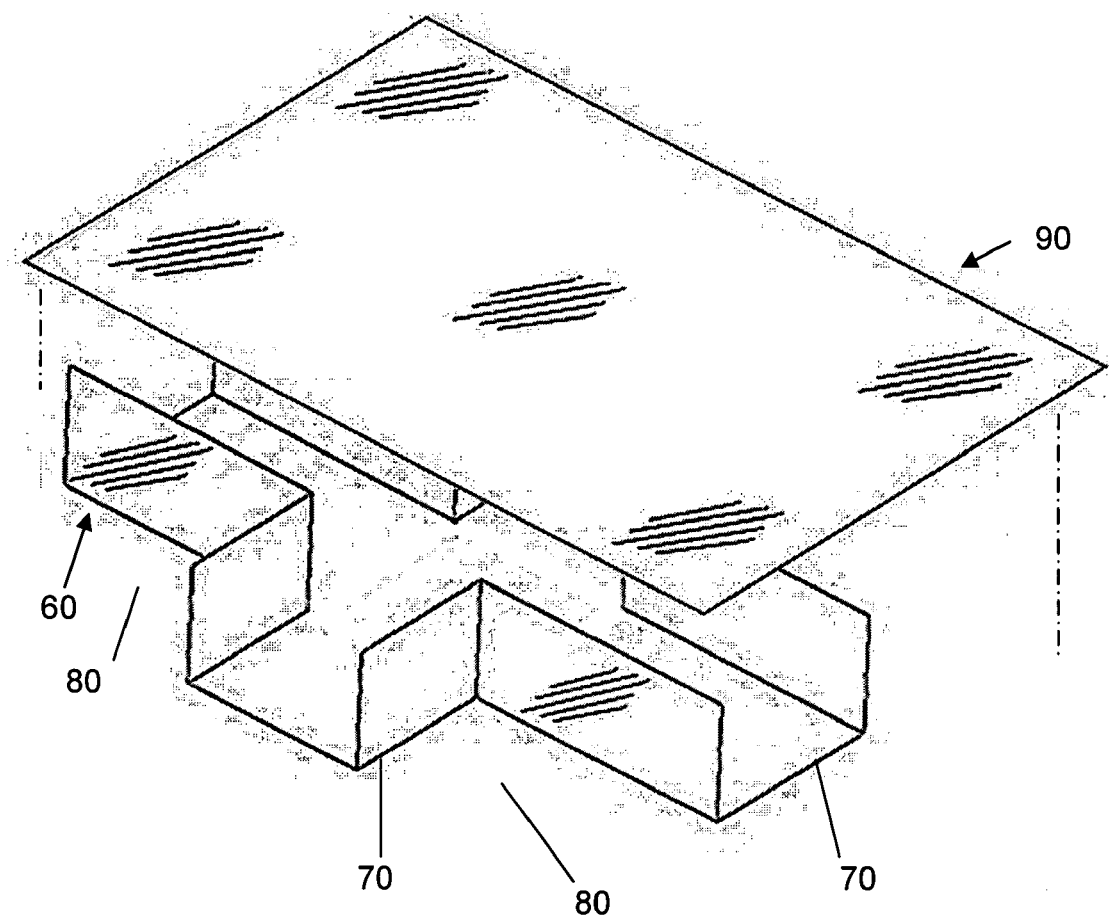
FIG. 7 is a perspective view showing a conventional beam-type hood structure.

First, an example of the multi-tiered hood structure according to the present invention will be described. FIG. 1 is a perspective view of an inner. FIG. 2 is a plan view of an inner. FIG. 5 is a sectional view taken along lines 5—5 of FIG. 1. FIG. 1 and FIG. 5 are shown for easy understanding of the multi-tiered form according to the present invention.

Figure 3:
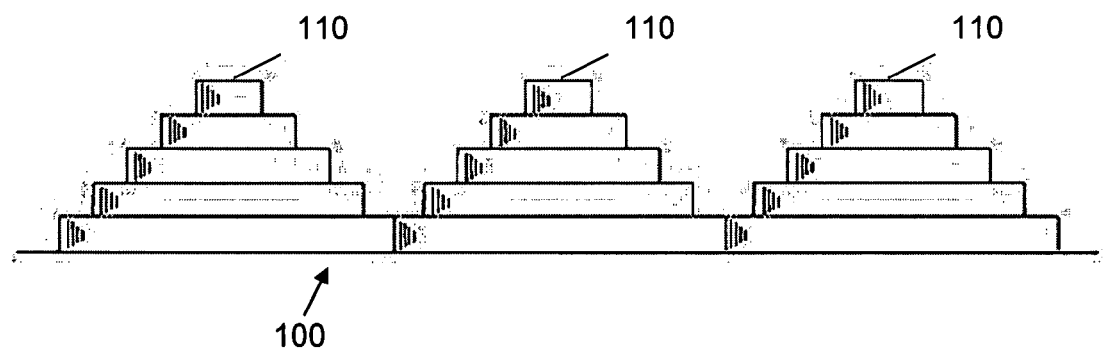
FIG. 3 is an elevation view showing an example of an inner according to the present invention.
Figure 4:
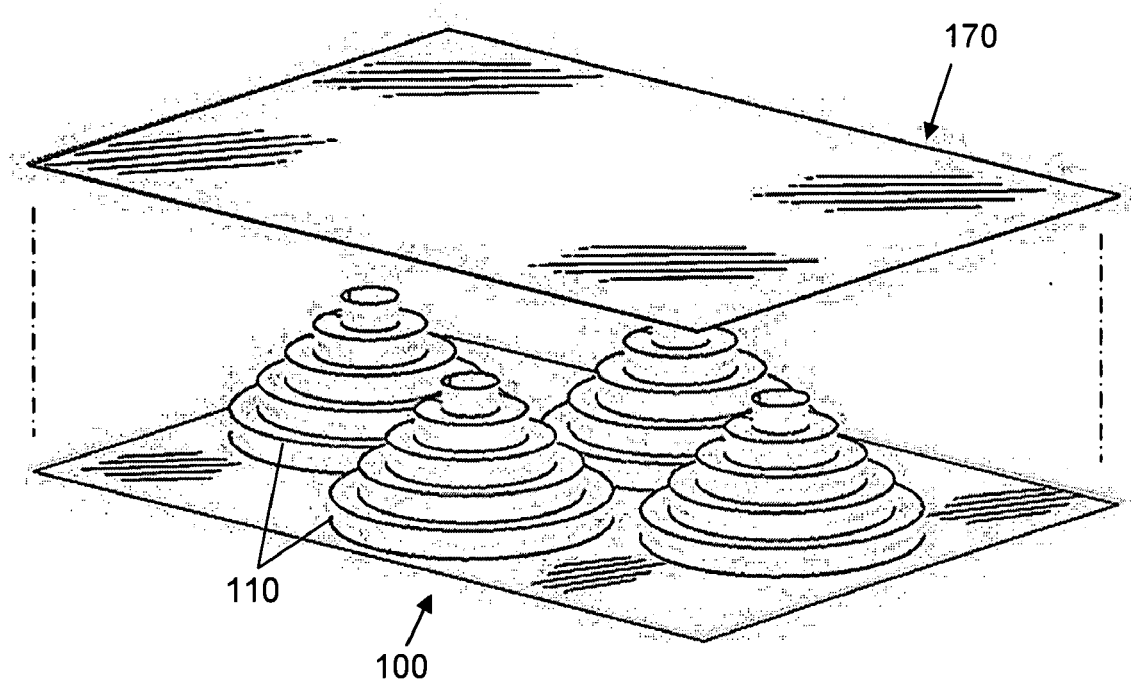
FIG. 4 is a perspective view of a multi-tiered hood structure in FIG. 1.

An inner 100 in FIG. 1, FIG. 2 and FIG. 3 is made of light-weight and high-tension metal such as stainless steel. There is provided a plurality of multi-tiered structures 110 approximately parallel along the car length direction all over the panel except the panel peripheries. The panel periphery contains the hem joining the inner and outer at close proximity to each other. Hem construction is not shown. The approximate parallel relationship is not the only way to apply multi-tiered structures. Multi-tiered structures can be applied in circular and slantwise arrangement.

As shown in the sectional view of FIG. 5, a multi-tiered structure 110 forms a multi-tier shape comprising a stair step curve along the car width. The multi-tiered structure 110 comprises a top tier 120 and a bottom tier 130. The top tier 120 is protruded toward the outer and has a cross section forming a series of stair steps comprising a plurality of interconnected horizontal treads 140 and plurality of vertical risers 150. On the contrary, the bottom tier 130 is depressed away from the outer and likewise has a cross section forming a series of stair steps. In FIGS. 1, 2, 3 and 5, a plurality of multi-tiered structures 110 are approximately parallel provided independently of each other (with an interval) on the surface of the inner 100.

The multi-tiered structures 110 in FIGS. 1, 2, 3 and 5, including the bottom tiers 130, have approximately the same width across the longer direction. However, the multi-tiered structures 110 including the bottom tier 130 need not always have the same width across the longer direction. From a planar viewpoint, for example, it may be preferable to provide a locally narrowing constriction or dent functioning as a starting point for the overall deformation of the inner in case of a car collision to absorb a shock and protect fellow passengers. Alternatively, the multi-tiered structures 110 may be formed to be gradually narrowing or expanding in accordance with the car body design.

The conditions for the multi-tiered structures 110 such as the sectional shape (width, height, tilt angle for the slope), the number of tiers within the structure, number of structures, the length, arrangement and the like are not limited to this embodiment. In consideration for the optimization of the rigidity and the ease of molding, it is preferable to select the maximum multi-tiered structure height from the range between 10 mm and 60 mm. Each tread is 10 mm & each riser is 10 mm of the cross sectional stair step curve, therefore, approximately being the same size.

For example, it is possible to increase the rigidity of the inner or the panel structure by the design of the multi-tiered structures so that they form a large cross sectional shape, many multi-tiered structures are provided, and multi-tiered structures are provided all over the panel. Accordingly, the sectional shape and condition of the multi-tiered structures 110 and condition of the tiers are appropriately selected in consideration for the relationship among the rigidity, and strength requested for the design, and a criterion whether manufacturing is possible or easy (manufacturability).

For further light-weighting the inner, it may be preferable to provide the multi-tiered structures 110 with a space or a cutout (any shape such as a circle, a rectangle, or the like) by partially trimming the panel so as not to affect the rigidity and the strength. Further, it may be preferable to appropriately combine another rigidity reinforcing means. For example, the inner may be made as a tailor blank to thicken or thin the inner's outside periphery compared to the center plate thickness and to improve the bending rigidity of the panel or the panel structure against a bending load applied to the edge of the panel or the panel structure.

(Cross-Sectional Shapes of the Inner)

Cross-sectional shapes of the inner according to the present invention may be defined by a stair step curve made of multiple tiers based on a series of concentric geometric shapes. Further, it may be preferable to adjust the local rigidity by increasing or decreasing the size & number of tiers.

(Arranging the Multiple Tier Structures on the Inner)

When the multi-tiered inner according to the present invention is observed from a planar viewpoint, it is preferable to arrange the multi-tiered structures parallel to each other so as to be parallel or oblique against the longer direction of the hood, concentric or oval approximately around the center of the multi-tiered inner. The multi-tiered structures arranged in these manners configure a cross-sectional shape of the inner across the overall panel. It should be noted that these specific arrangements are not strictly specified. The specification includes the meaning of approximation such as "approximately parallel" or "approximately concentric" in terms of permitting allowable tolerances as far as an effect of improving the rigidity is not impaired.

(Hood Structure)

The following describes the hood structure as an integration of the inner and the outer. The hood structure in FIG. 5 uses a resin layer 50 arranged on a top 120 of a multi-tier structure of the inner 100. The resin layer works as an adhesive to join a flat top outer 170 of the multi-tiered structure 110 with the underside of an outer 170 formed in a flat to be integrated into a closed sectional structure through spaces. The inner 100 and the outer 170 are fastened together with the adhesive to be integrated into the hood structure by hemming a hem around the periphery of the outer and inner forming closed spaces.

(Mechanism to Improve the Head Impact Resistance for Protecting Pedestrians)

From the viewpoint of solving problems about an impact between the head and the hood for the purpose of protecting pedestrians, the multi-tiered inner can very satisfactorily absorb the head's kinetic energy and greatly decrease the HIC value. This is because of the following:

(a) Multiple tiers of the multi-tier inner provide design flexibility to optimize energy absorption by being able to change the size of the concentric geometric shapes along with the stair step cross sectional shape. When a head impact occurs, one tier deforms into subsequent connecting tiers creating sequential buckling. The plurality of sequential buckling of each tier efficiently slows the deceleration of the head. As a result, the plurality of discrete buckling of the multiple tiers decreases the HIC value.

(b) When a head impact occurs, the outer and the inner cause a backlash vibration to disturb the head acceleration waveform. As a result, it is possible to greatly reduce the second acceleration wave to decrease the HIC value.

(c) Is effective for reducing HIC values for all material combinations for the outer and inner panel providing maximum flexibility to optimize pedestrian protection, weight and cost.

(Preferred Ranges of Multi-Tier Structure Radii and Height)

For the embodiment shown in FIG. 1 mathematical formulas are provided for the size of the radii forming the individual tiers and the height of the individual tier as measured from the base of the hood inner panel 130 to the top 120 of the inner panel. The number and size of tiers is variable and subject to optimization for the specific application. In the embodiment shown in FIG. 1, the maximum number of tiers is 5, the tier radius maximum is 50 mm and the tier height maximum is 50 mm. Each horizontal tread 140 and vertical riser 150 of the stair step curve forming the cross sectional shape are equivalent. For the embodiment given in the example the following relationships are provided:

Maximum Number of Tiers in the Multi-Tier Structure=5

Tread/Riser Ratio=1

Tier Radius Maximum/Tier Height Maximum Ratio=1

Maximum number of tiers is hereafter referred to as simply, Tiermax. Radius maximum is hereafter represented as simply Rmax. Maximum height of tier is hereafter represented as simply Hmax. Hence, size and position at any tier number from Tier #N=1 to Tier #N=5 is represented by the following general equations:

Radius of Tier at Tier #$N$=$R$max−[$R$max/Tiermax (Tiermax−Tier #$N$)]

Height of Tier at Tier #$N$=$H$max−[$H$max/Tiermax (Tiermax−Tier #$N$)]

(Applicable Metals)

Metals used for the panel according to the present invention are appropriately selected from generally used Aluminum alloy plates (AL), high-tension steel plates, and the like. However, the use of plastic resin is impractical and is not applied to the panel according to the present invention. This is because the resin must be extremely thickened due to its characteristics such as the material strength in order to provide the rigidity required for the present invention. One material often not studied in the literature on pedestrian protection is stainless steel which is an alloy.

The aluminum material is often used for light-weighting the hood but is not rigid, not strong and is costly. Steel material is often used for rigidity but is not light weight despite being inexpensive. There is significant debate & discussion of aluminum versus steel for pedestrian protection and the advantages and disadvantages of each material in the application of a hood structure for pedestrian protection.

The use of the stainless steel material is generally not discussed in the literature regarding pedestrian protection despite having high yield strength, high rigidity, easy manufacturability, opportunity for low weight and low cost through thickness optimization. Stainless steel is a generic name covering a group of metallic alloys with chromium content in excess of 10.5% and a maximum carbon content of 1.2% and often other elements, such as nickel and molybdenum. Several other alloying elements can be added to this chrome-iron matrix to form well over 150 different compositions, each with unique characteristics. Due to the formation of a passive layer, which is 1.0 to 2.0 nm thick, this metal presents an excellent corrosion resistance. Compared to a coating the passive layer has the advantage that it is self-healing and therefore chemical or mechanical damages to it repassivate in oxidizing environments. Furthermore the mechanical properties of stainless steel make this material appropriate for the use in automotive body panels. An excellent stress strain behavior especially in cold worked condition leads to a high energy absorption capability. Therefore this material is especially suitable for structures determined by impact behavior.

Stainless steel is not an obvious solution for pedestrian protection because of the high yield strength and high Young's modulus. High yield strength & high Young's modulus is generally viewed as potentially limiting deformation hence potentially increasing HIC values and potentially detrimental to pedestrian protection.

Stainless steel has high yield strength & high Young's modulus, therefore, the material thickness can be significantly reduced as compared to aluminum and steel and still provide the comparable rigidity and strength. The impact of material thickness and the relevance of stainless steel will become apparent by comparing material properties and showing the significance of material thickness on material deformation, HIC and pedestrian protection.

A hood can be approximated by a model of a simply supported plate. The maximum static deflection of a simply supported plate is proportional to 1/E T.sup3. Pedestrian protection is a dynamic problem with permanent deformations so yield strength, simply referred to as YS hereafter, must be taken into account. HIC is minimized by maximizing deflection and slowing decelerations. Therefore HIC is proportional to E T.sup3. Thickness T has far greater influence on HIC than Young's modulus E because thickness is to the cubed power. In order to design a hood that minimizes HIC, material thickness must be made minimum while maintaining good rigidity E and good strength YS. Minimum material thickness also has the advantage of minimizing weight and minimizing cost which is advantageous. To design for equivalent strength defined as the product of yield strength times thickness, thickness must be scaled according to the yield strength of the material. The following yield strength ratios are given for high strength steel, hereafter simply HS; Aluminum, hereafter simply AL; and stainless steel, hereafter simply SS.

($YS_s/YS_a=11.49$, $YS_{ss}/YS_s=1.46$, $YS_{ss}/YS_a=2.18$,)
($E_s/E_a=3$, $E_{ss}/E_s=1$, $E_{ss}/E_a=3$,)

Hence the thickness ratios are: $T_s/T_a=0.65$, $T_{ss}/T_s=0.69$, $T_{ss}/T_a=0.45$)

Normalized Material Properties for: High Strength Steel, hereafter simply HS; Aluminum, hereafter simply AL; and Stainless Steel, hereafter simply SS Young's Modulus; HS=1.00; AL=0.33; SS=1.00
Yield Strength; HS=0.68; AL=0.46; SS=1.00
Ultimate Strength; HS=0.53; AL=0.34; SS=1.00
Density; HS=1.00; AL=0.35; SS=1.00
Elongation; HS=0.65; AL=0.35; SS=1.00
Cost; HS=0.50; AL=1.00; SS=0.73
Design Stiffness (E*T); HS=1.00; AL=0.51; SS=0.69
Design Strength (YS*T); HS=0.97; AL=1.00; SS=0.98

A Design of Experiments was conducted with Finite Element Analysis, hereafter Finite Element Analysis is simply represented by FEM, for the panel structure according to the present invention and compared the HIC performance of the multi-tiered hood structure with those of the beam-type and cone-type hood structure for all the possible combinations of materials for the outer panel and inner panel. The materials included: stainless steel, aluminum and high strength steel. Three inner geometric constructions: multi-tier inner, beam-type inner & cone-type inner combined with three different material variables for the outer and inner panels: stainless steel, aluminum and high strength steel provided for 27 distinct FEM analyses.

The material thickness was calculated based on maintaining uniform Design Strength, defined as yield strength times material thickness, for all three different material types. Therefore, normalized Design Strength was approximately equal to one for all three different materials. The FEM analysis was conducted in accordance with adult head models and test procedures indicated in the EEVC/WG17 requirements. The adult head is simply modeled as a rigid sphere whose outside peripheries are covered with a skin having an even thickness. The adult heads weighs 4.8 kg with outside diameter of 165 mm. The impact angle is 65 degrees and impact speed is 40 km/h. We used an elastic material for the skin and determined its elastic modulus so that an acceleration response satisfies a specified range during a drop test requested by EEVC/WG17.

3 by 3; 27 Run Design of Experiments results using FEM. The HIC values are normalized to the maximum HIC value for the purposes of easy comparison Run1: Beam-Type, Aluminum Outer, Aluminum Inner; HIC=1.00

Run2: Beam-Type, Aluminum Outer, High Strength Steel Inner; HIC=0.777

Run3: Beam-Type, Aluminum Outer, Stainless Steel Inner; HIC=0.674

Run4: Beam-Type, High Strength Steel Outer, Aluminum Inner; HIC=0.932

Run5: Beam-Type, High Strength Steel Outer, High Strength Steel Inner; HIC=0.761

Run6: Beam-Type, High Strength Steel Outer, Stainless Steel Inner; HIC=0.647

Run7: Beam-Type, Stainless Steel Outer, Aluminum Inner; HIC=0.964

Run8: Beam-Type, Stainless Steel Outer, High Strength Steel Inner; HIC=0.840

Run9: Beam-Type, Stainless Steel Outer, Stainless Steel Inner; HIC=0.668

Run10: Cone-Type, Aluminum Outer, Aluminum Inner; HIC=0.577

Run11: Cone-Type, Aluminum Outer, High Strength Steel Inner; HIC=0.582

Run12: Cone-Type, Aluminum Outer, Stainless Steel Inner; HIC=0.588

Run13: Cone-Type, High Strength Steel Outer, Aluminum Inner; HIC=0.569

Run14: Cone-Type, High Strength Steel Outer, High Strength Steel Inner; HIC=0.580

Run15: Cone-Type, High Strength Steel Outer, Stainless Steel Inner; HIC=0.587

Run16: Cone-Type, Stainless Steel Outer, Aluminum Inner; HIC=0.564

Run17: Cone-Type, Stainless Steel Outer, High Strength Steel Inner; HIC=0.543

Run18: Cone-Type, Stainless Steel Outer, Stainless Steel Inner; HIC=0.597

Run19: Multi-Tier, Aluminum Outer, Aluminum Inner; HIC=0.390

Run20: Multi-Tier, Aluminum Outer, High Strength Steel Inner; HIC=0.319

Run21: Multi-Tier, Aluminum Outer, Stainless Steel Inner; HIC=0.332

Run22: Multi-Tier, High Strength Steel Outer, Aluminum Inner; HIC=0.379

Run23: Multi-Tier, High Strength Steel Outer, High Strength Steel Inner; HIC=0.312

Run24: Multi-Tier, High Strength Steel Outer, Stainless Steel Inner; HIC=0.297

Run25: Multi-Tier, Stainless Steel Outer, Aluminum Inner; HIC=0.385

Run26: Multi-Tier, Stainless Steel Outer, High Strength Steel Inner; HIC=0.315

Run27: Multi-Tier, Stainless Steel Outer, Stainless Steel Inner; HIC=0.296

As seen from Run20-Run 27 the HIC values for the multi-tier hood structure is smaller than beam-type or cone-type structures for all possible material combinations analyzed. As seen from the data, Run 27 with multi-tier inner panel structure, stainless steel outer panel material and stainless steel inner panel material gave the lowest normalized HIC value due to the contributions of minimized material thickness while still maintaining sufficient thickness for equivalent strength and good rigidity.

It is also advantageous to have the same material for the inner panel as outer panel since this eliminates the potential for galvanic corrosion to occur from bringing dissimilar metals into close proximity. Such a configuration results in added cost of needing insulation between dissimilar materials to prevent galvanic corrosion and premature failure. Stainless steel also has manufacturing advantages, because of the high ductility and elongation compared to aluminum and high strength steel. Complex shapes can be manufactured with minimal risk of cracks and splits. Complex shapes and geometries can be manufactured from stainless steel that cannot be manufactured from aluminum or high strength steel.

(Advantages)

From the description above, a number of advantages of the embodiments become evident:

(a) The multi-tier hood structure reduces HIC more effectively as compared to beam-type or cone-type hood in a minimum amount of space without the cost of separate added in HIC counter measures.

(b) The multi-tier hood structure reduces HIC effectively for all material combinations of the outer panel & inner panel providing maximum flexibility to the design and designer.

(c) The multi-tier hood structure can further reduce cost & weight by utilizing stainless steel material for the outer and inner panels at minimum material thickness while maintaining high strength and high rigidity due to the superior properties of stainless steel.

(d) The multi-tier hood structure with stainless steel outer and inner panels does not have concerns with galvanic corrosion due to combination of dissimilar materials.

(e) The multi-tier hood structure with stainless steel outer and inner panels is easy to manufacture due to the ductility and elongation of stainless steel compared to aluminum and high strength steel. This enables design of complex shapes and geometries.

(f) The multi-tier hood structure with stainless steel outer and inner panels has excellent corrosion protection due to passive layer.

(g) The multi-tier hood structure is easily scalable in terms of size and design features to meet any performance criteria. The size of the multi-tiered structures can be increased or decreased. The number of tiers within a structure can be increased or decreased and the tread and riser interconnecting the tiers can be increased or decreased Although the description above contains many specificities, these should not be construed as limiting the scope of the embodiment but as merely providing illustrations of some of the presently preferred embodiments. For example, the multi-tier inner panel can have other shapes other than circular such as: rectangular, oval, trapezoidal, triangular, elliptical, etc.; the size of the tread and riser comprising the cross sectional shape and interconnecting the multiple tiers can be made of variable size and variable slopes.

Thus the scope of the embodiment should be determined by the appended claims and their legal equivalents, rather than by the examples given.

What is claimed is:

1. A car body panel structure as a closed sectional structure comprising a combination of:
    a stamped metal outer panel;
    a stamped metal inner panel, wherein a plurality of multiple tiered structures is provided parallel to each other on a major part of a surface of said inner panel such that a cross-sectional shape of said inner panel has multiple tier shape; and
    an adhesive joining the multiple tiers of the inner panel with the outer panel.

2. The car body panel structure according to claim 1, wherein said multiple tier shape follows a stair step curve based on a series of interconnected geometric shapes.

3. The car body panel structure according to claim 1, wherein said plurality of multiple tiered structures is provided in at least one arrangement selected from those which are parallel or slantwise against a longer direction of said panel structure, and concentric approximately around the center of said panel structure.

4. The car body panel structure according to claim 1, wherein one of said outer panel and said inner panel is aluminum or steel.

5. The car body panel structure according to claim 1, wherein one of said outer panel and said inner panel is aluminum or stainless steel.

6. The car body panel structure according to claim 1, wherein one of said outer panel and said inner panel is steel or stainless steel.

7. The car body panel structure according to claim 1, wherein the cross-sectional multiple tiered shape of said inner panel forms an interconnected stair step curve.

8. The car body panel structure according to claim 1, wherein said multiple tier shape follows said interconnected stair step curve based on a plurality of concentric circular shapes.

9. The car body panel structure according to claim 1, wherein said adhesive is a resin, whereby said inner panel and said outer panel are softly joined at one of said multiple tiered structure of said inner panel.

10. The car body panel structure according to claim 1, wherein said inner panel is joined to said outer panel at said multiple tiered structure by means of soft joining sections which are arranged in a parallel or slantwise manner.

11. The car body panel structure according to claim 1, wherein said multiple tier shape is defined by a step function.

12. The car body panel structure according to claim 1, wherein said outer panel is stainless steel and said inner panel is a stainless steel multiple tiered inner panel.

* * * * *